(12) United States Patent
Schoeck, Jr. et al.

(10) Patent No.: US 6,500,541 B1
(45) Date of Patent: Dec. 31, 2002

(54) WATER-BLOCKED TELECOMMUNICATIONS CABLES, AND WATER-BLOCKING YARNS USEFULLY EMPLOYED IN SAME

(75) Inventors: Vincent E. Schoeck, Jr., Hagerstown, MD (US); Edwin E. Fuller, Hagerstown, MD (US); Andrew Dubnik, Williamsport, MD (US)

(73) Assignee: Fil-Tech, Inc., Cavetown, MD (US)

( * ) Notice: Subject to any disclaimer, the term of this patent is extended or adjusted under 35 U.S.C. 154(b) by 30 days.

(21) Appl. No.: 09/665,352

(22) Filed: Sep. 18, 2000

(51) Int. Cl.$^7$ .......................... D02G 3/00; H02G 15/02; B05D 3/02
(52) U.S. Cl. ..................... 428/372; 428/375; 428/394; 428/395; 428/379; 174/23 R; 174/23 C; 174/110 N; 427/180; 427/372.2; 427/384
(58) Field of Search ................................. 428/364, 375, 428/394, 395, 372, 379; 174/20, 23 R, 23 C, 110 N; 427/180, 372.2, 385.5, 384

(56) References Cited

U.S. PATENT DOCUMENTS

| | | |
|---|---|---|
| 3,336,415 A | 8/1967 | Kennedy |
| 3,462,337 A | 8/1969 | Gorton |
| 3,636,136 A | 1/1972 | Konopik |
| 3,637,550 A | 1/1972 | Sprauer |
| 4,450,126 A | 5/1984 | Kesting |
| 4,477,598 A | 10/1984 | Kesting |
| 4,774,038 A | 9/1988 | Ditter et al. |
| 4,992,515 A | 2/1991 | Ballard |
| 5,227,236 A | 7/1993 | Handermann |
| 5,264,251 A | 11/1993 | Geursen et al. |
| 5,342,686 A | 8/1994 | Guersen et al. |
| 5,500,209 A | 3/1996 | Ross et al. |
| 5,543,215 A | 8/1996 | Hansen et al. |
| 5,817,713 A | 10/1998 | Pappas et al. |

OTHER PUBLICATIONS

Functional Performance of Ocean Water–Blocking Taped by Naren I. Patel; Siecor Corp. USA; E94–E97; EuroWire—Sep. 1999.

Reliability of Dry Waterblocking Materials by Anne G. Bringuier, Clinton E. Clyburn III, Siecor Corporation, Research, Development and Engineering—USA; E60–E64; Euro–Wire—Mar. 1999.

Emphasis: Fiber Optic Cable Manufacturing; Water Blocking with Yarns and Tapes by Stephen W. Czupryna; Geca–Tapes b.v.; Europalaan 25—5121 DH Rijen; The Netherlands; pp. 43–44; Nov. 1999/Wire & Cable Technology International.

(List continued on next page.)

Primary Examiner—Cynthia H. Kelly
Assistant Examiner—J. M. Gray
(74) Attorney, Agent, or Firm—Nixon & Vanderhye P.C.

(57) ABSTRACT

Synthetic polymeric filaments containing SAP particles adhered to the filament surfaces by an nylon binder which is soluble in alcohols (e.g., lower C1–C3 aliphatic alcohols). Such SAP-coated filaments may then be incorporated into telecommunications cables as a component part thereof to achieve enhanced water-blocking functions. In preferred embodiments, the SAP particles include homopolymers, copolymers, and/or mixtures of sodium and potassium polyacrylates, starch grafted sodium polyacrylates and partial sodium salts of polypropenoic acid which are bound to the yarn surfaces by the nylon binder. Most preferably, the coated multifilamentary yarns of the present invention are made by bringing an uncoated yarn into contact with a nonaqueous liquid coating material comprised of the nylon binder dissolved in an alcohol solvent containing a dispersion of the SAP particles for a time sufficient to coat the yarn with the liquid coating material. Thereafter, the "wet" coated yarn is dried at an elevated temperature above the melting point of the nylon binder but below the melting point of the SAP particles for a time sufficient to evaporate the alcohol solvent. The SAP particles will therefore be bound to the yarn surfaces by the residue of the nylon binder that remains following drying.

30 Claims, 3 Drawing Sheets

OTHER PUBLICATIONS

Dupont Elvamide®; Nylon Multipolymer Resins; Properti4es and Uses; undated.

Elvamide®; Nylon Multipolymer Resins; Product and Properties Guide; Sparkling transparent crystals of Elvamide nylon multipolymer resins, magnified 4.5X.; Start with DuPont undated.

Elvamide®; Nylon Multipolymer Resins; Thread Bonding Guide; Start with DuPont undated.

Absorbent Polymers Data; CABLOC® 80 HS; Superabsorbent Polymer for Cable Systems; undated.

Shakespeare®; Monofilament Division; Nylon Multipolymer Resins; Type 637 and 651 undated.

Emphasis: Fibric Optic Cable Manufacturing Water Blocking with Yarns and Tapes by Stephen W. Czupryna, Geca–Tapes b.v.; Europalaan 25—5121 DH Rijen; The Netherlands undated.

EIA/TIA Standard; FOPT–82 Fluid Penetration Test for Fluid–Blocked Fiber Optic Cable; EIA/TIA–455–82B (Revision of EIA–455–82A); Feb. 1992; Electronic Industries Association; Engineering Department.

WATER-BLOCKED TELECOMMUNICATIONS CABLES, AND WATER-BLOCKING YARNS USEFULLY EMPLOYED IN SAME

FIELD OF THE INVENTION

The present invention relates generally to water-blocking yarns. In especially preferred embodiments, the present invention relates to telecommunications cables (e.g., optical fiber cables) which include a multifilament water-blocking yarn.

BACKGROUND AND SUMMARY OF THE INVENTION

Telecommunications cables have traditionally been provided with internal components which serve to minimize entry and migration of water which could catastrophically damage electronics connected to the cable as well as the cable itself. In this regard, the interstices within the cables have previously been flooded with a petrogel filler compound in an effort to minimize water entry and migration. More recently, superabsorbant polymers (SAP) have been employed for such purposes. See generally, Bringuier et al, *Reliability of Dry Waterblocking Materials,* EuroWire, pp. E60–E64 (March 1999), Patel, *Functional Performance of Ocean Water-Blocking Tapes,* EuroWire, pp. E94–E97 (September 1999), and Czupryna, *Water Blocking Yarns and Tapes,* Wire & Cable Technology International, pp. 43–44 (November 1999).[1]

[1] The entire content of each cited printed publication and U.S. Patent is hereby expressly incorporated herein.

Recently, U.S. Pat. Nos. 5,264,251 and 5,342,686 disclose aramid yarns coated with SAP that may be employed in optical communications cables. U.S. Pat. No. 5,817,713 discloses water-swellable fiber coatings whereby the coatings are semi-gel dispersions of SAP in a polyvinyl chloride plastisol. The dispersion may then be applied as a coating onto a fiber substrate and then heat cured to the semi-gel state. U.S. Pat. No. 5,543,215 discloses SAP particles bound to cellulosic fibers by means of a water-soluble polymeric binder having hydrogen bonding functionality or coordinate covalent bond forming functionality on each repeating unit of the polymer.

While the prior proposals have advanced the art of water-blocked cables to some extent, continual improvement is sought. Particularly, solutions to provide enhanced water-blocking functions for telecommunications cables (i.e. higher absorption capacity as well as faster swell rates) without appreciably increasing the size and/or weight of the finished cable are especially desired. It is towards fulfilling such solutions that the present invention is directed.

Broadly, the present invention is embodied in synthetic polymeric filaments containing SAP particles adhered to the filament surfaces by a nylon binder which is soluble in alcohols (e.g., lower C1–C3 aliphatic alcohols). Such SAP-coated filaments may then be incorporated into telecommunications cables as a component part thereof to achieve enhanced water-blocking functions. In preferred embodiments, the SAP particles include homopolymers, copolymers, and/or mixtures of sodium and potassium polyacrylates, starch grafted sodium polyacrylates and partial sodium salts of polypropenoic acid which are bound to the yarn surfaces by the nylon binder.

Most preferably, the coated multifilamentary yarns of the present invention are made by bringing an uncoated yarn into contact with a nonaqueous liquid coating material comprised of the nylon binder dissolved in an alcohol solvent containing a dispersion of the SAP particles for a time sufficient to coat the yarn with the liquid coating material. Thereafter, the "wet" coated yarn is dried at an elevated temperature above the melting point of the nylon binder but below the melting point of the SAP particles for a time sufficient to evaporate the alcohol solvent. The SAP particles will therefore be bound to the yarn surfaces by the residue of the nylon binder that remains following drying.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

As used herein, the term "filament" or "filaments" means fibrous strands of extreme or indefinite length. The term "yarn" means a collection of numerous filaments which may or may not be textured, twisted or laid together. Flat yarn refers to a yarn with little or no twist whereas a twisted & plied yarn refers to a twisted yarn that is then plied with one or more twisted yarns.

Figure 1:
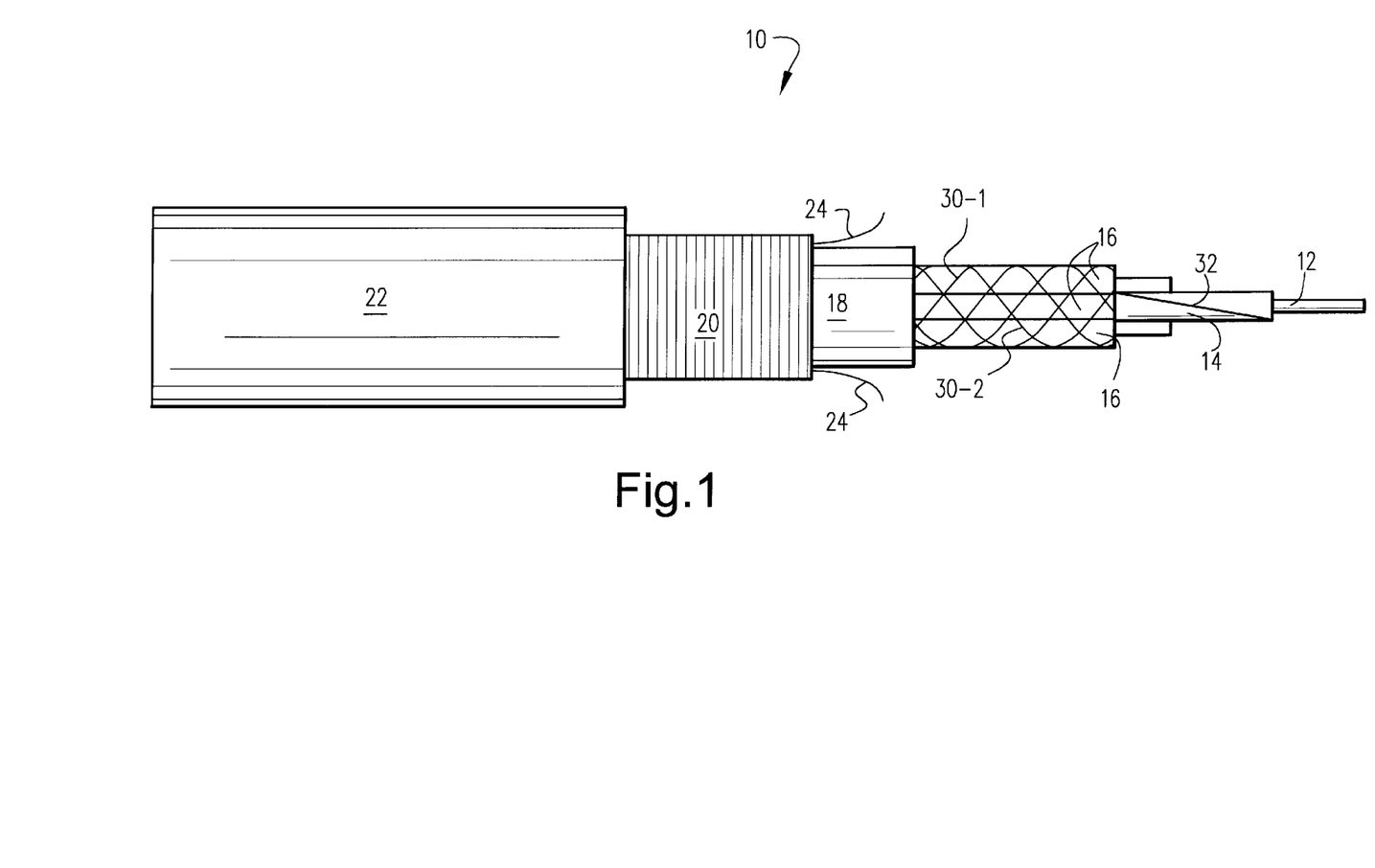
FIG. 1 is a schematic view, partly in section, of an exemplary water-blocked telecommunications cable.

Accompanying FIG. 1 depicts an exemplary structure of a telecommunications cable 10. As shown, the cable 10 is provided with a central member 12 (e.g., a metal or other load bearing structure) surrounded, in sequence, by a central sheath 14, fiber buffer tubes 16, dielectric bedding tape 18, a corrugated steel tape 20 and a polymeric (typically polyethylene) outer sheath 22. Ripcords 24 may be interposed between the bedding tape 18 and the steel tape 20 so as to assist in removal of the steel tape 20 and outer sheath 22 to permit ease of access to the internal cable components for purpose of field connection, splicing and the like.

The SAP-coated water-blocking yarns according to the present invention may be employed in one or more locations within the structure of the cable 10. For example, as shown in FIG. 1, a set of water-blocking yarns 30-1, 30-2 in accordance with the present invention may be wrapped in reverse directions, or otherwise served around the fiber buffer tubes 16. Such yarns are typically referred to as binder or serving yarns. Alternatively, or additionally, a yarn 32 in accordance with the present invention may be applied under the fiber buffer tubes along with the central cable components. Such yarns are typically referred to as central member yarns. Furthermore, yarns in accordance with the present invention may comprise the rip cords 24.

Figure 2:
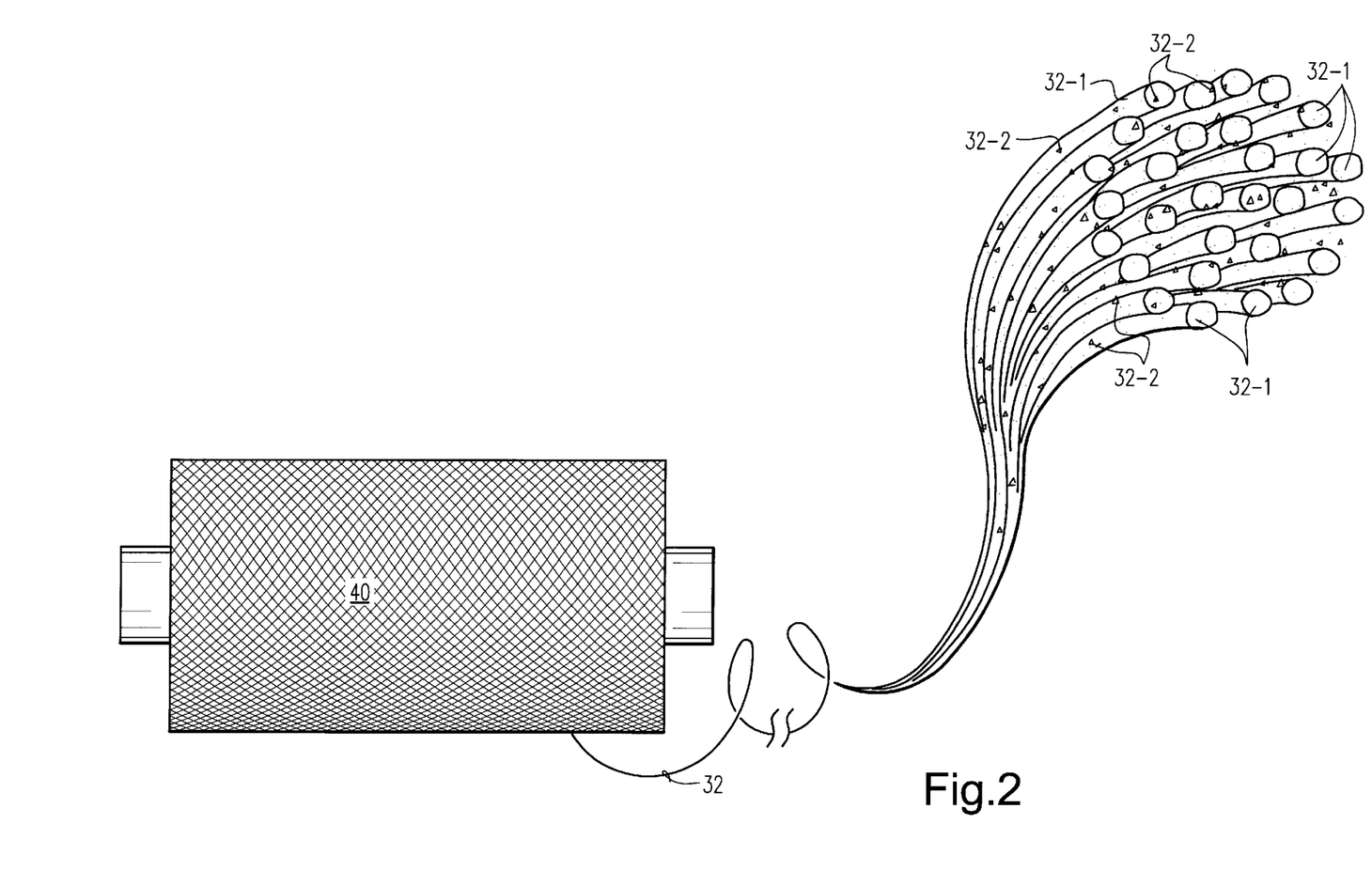
FIG. 2 is a schematic view of a SAP-coated yarn in accordance with the present invention.

The yarn 32 according to the present invention is schematically depicted in accompanying FIG. 2, it being understood that it is representative also of the yarns 30-1 and 30-2 noted above (and the rip cords 24 if employed for the same). In this regard, the yarn 32 is comprised of numerous synthetic polymeric filaments, a few of which are identified by reference numeral 32-1. Solid particles of SAP material 32-2 are adhered to the surfaces of such filaments 32-1 via an alcohol-soluble nylon resin (not shown). As can be appreciated therefore, the SAP particles are presented physically to any water that may invade the interior of the cable 10. The water present within the cable will thereby be absorbed by the SAP to minimize (if not eliminate entirely) potential problems that such water might cause to the cable itself and/or the telecommunications equipment to which it is connected.

An extreme length of the yarn 32 may be provided commercially in any convenient form, such as by a yarn package 40 as depicted in FIG. 2. In this regard, the nylon binder material which adheres the SAP particles 32-2 to the surfaces of the individual filaments 32-1 can be made "tacky" (each layer of yarn tacked to the previous layer) by bringing the yarn into contact with a small amount of alcohol during winding of the package 40. In this manner, the yarn 32 is maintained in the form of the yarn package 40 having enhanced package integrity and draw-off tension control.

Virtually any SAP material may be used in the practice of the present invention. The SAP may have a variety of average particle sizes depending on the particular end-use application. Typically, average particle sizes of between about 1 to about 900 μm, and more preferably, between about 1 to about 450 μm, are employed in the practice of the present invention.

The preferred SAP materials include homopolymers, copolymers, and/or mixtures of sodium and potassium polyacrylates, starch grafted sodium polyacrylates and partial sodium salts of polypropenoic acid. The SAP material may also be at least partially cross-linked. Most preferably, the SAP material employed in the practice of the present invention is sodium polyacrylate homopolymer with an average particle size of between about 1 to about 106 μm and a bulk density of between about 400 to about 700 g/l. Such a polymer is commercially available from Stockhausen Inc, of Greensboro, N.C. under the trademark CABLOC® 80HS. Other equivalent commercially available SAP materials include AQUA KEEP® J-550-SF from Sumitomo Seika Chemicals Co., Ltd, and SANWET® IM100F from Hoechst Celanese Corporation.

The polymeric binder is most preferably a nylon (linear polyamide) which is soluble in lower linear C1–C3 alcohols at room temperature (20° C.). Most preferably, the nylon binder is a water-insoluble, alcohol-soluble nylon multipolymer resin described more fully in U.S. Pat. Nos. 3,336,415; 3,462,337; 3,636,136 and 3,637,550. Such nylon multipolymer resins are commercially available from DuPont under the trademark ELVAMIDE®, as well as the Series 600 nylon multipolymer resins commercially available from Shakespeare. The preferred nylon multipolymer resins will typically exhibit a specific gravity (ASTM D792) of between about 1.05 to about 1.10 g/cm$^3$, a melting point (ASTM D789) of between about 120° C. to about 170° C., a tensile strength (ASTM D638) at 23° C. of between about 20 to about 60 MPa, an elongation at break of between about 350 to about 650%, and a flexural modulus of between about 175 to about 280 MPa.

The filaments onto which the SAP and binder material are coated may be formed of any synthetic fiber-forming melt-spinnable material, especially polyesters, polyamides and polyolefins. Suitable polyesters include (but are not limited to) polyethylene terephthalates, polybutylene terephthalates, polytrimethylene terephthalates and copolymers and mixtures thereof. Suitable polyamides include (but are not limited to) nylon 6, nylon 6,6, nylon 6,9, nylon 6,10, nylon 6,12, nylon 11 nylon 12 and copolymers and mixtures thereof. Suitable polyolefins include polypropylene, polypropylene derivatives and copolymers and mixtures thereof. High temperature and/or other filament-forming materials may be employed, such as filaments formed of aramid polymers, fiberglass, polyetherether ketones, and the like. The filaments may or may not be twisted, laid together or plied with other yarns or may be textured so as to exhibit increased bulk characteristics. Textile finishes may be applied to the yarn to modify frictional properties and/or improve processibility.

The dried coating material comprised of the SAP material and the binder material will most preferably comprise between about 25 to about 95 wt. % of the SAP material. The dried coating material itself will most preferably be present on the filamentary yarn in accordance with the present invention in an amount between about 10 wt. % to about 75 wt. % based on the total dried yarn weight. By way of examples, twisted & plied rip cord yarns may be provided with a dried coating of between about 10–40 wt. % (preferably about 20–30 wt. %) based on the total dried yarn weight. Flat yarns may be provided with a dried coating of between about 25–75 wt. % (preferably about 40–50 wt. %) based on the total dried yarn weight while textured yarns may be provided with between about 50–75 wt. % of dried coating material (preferably about 60–70 wt. %).

The yarns in accordance with the present invention will thus exhibit an absorption capacity of between about 5 to about 140 grams of water per gram of yarn ($g_w/g_y$), more preferably between about 5 to about 55 $g_w/g_y$ for twisted & plied yarns (typically rip cords yarns), 25 to about 85 $g_w/g_y$, for flat yarns (typically binder or serving yarns) and between about 50 to about 140 $g_w/g_y$ for textured yarns (typically central member yarns).

Figure 3:
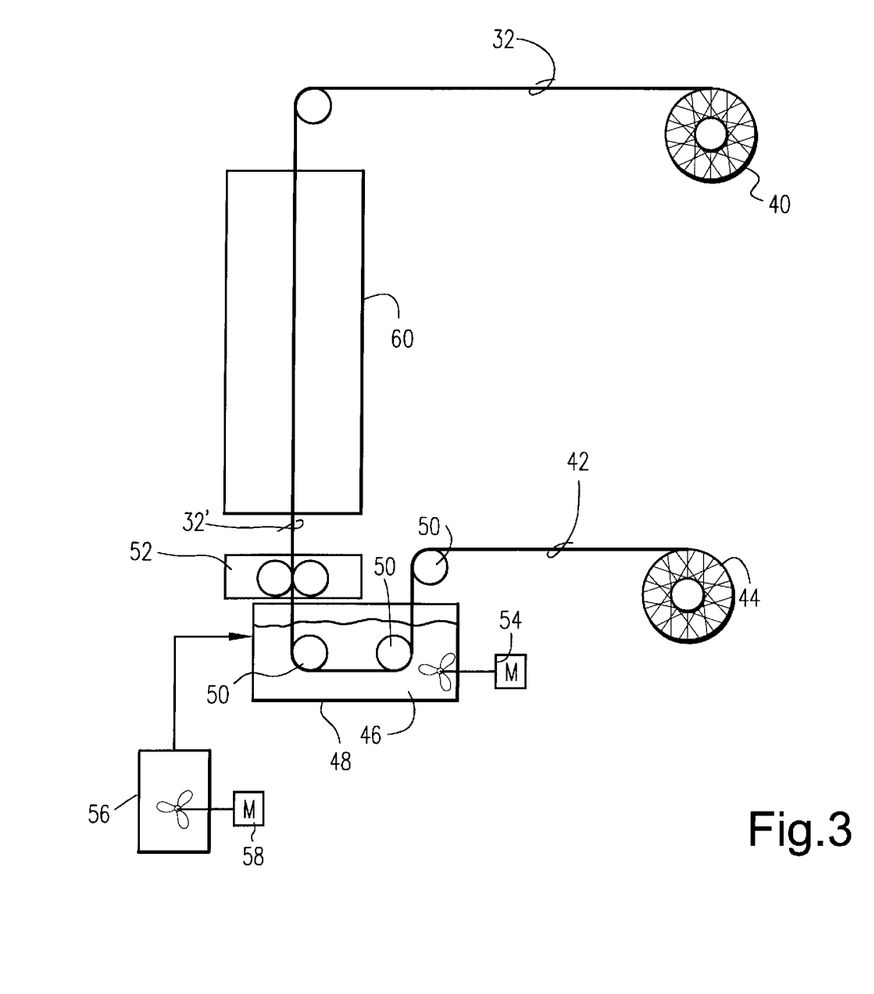
FIG. 3 is a schematic view of a preferred technique for making the yarns in accordance with the present invention.

As shown in accompanying FIG. 3, the coated yarns 32 of this invention are most preferably made by bringing an uncoated yarn 42 from a supply package 44 thereof into contact with a liquid coating material 46 comprised of an alcohol solution of the binder in which the SAP material is dispersed. In this regard, it is most preferred that the uncoated yarn be run continuously through a dip tank 48 containing the liquid coating material 46 by directing the yarn 42 around suitable guide rollers 50. A metering device 52 is provided so as to meter the pick-up amount of the coating material 46 onto the yarn 42. The residence time in the dip tank 48 and metering device 52 through which the wet-coated yarn (now designated 32' in FIG. 3) passes after being removed from the tank serve to control the add-on weight of the coating material to within desired limits.

The liquid coating material 46 is most preferably comprised of a linear alcohol (e.g., methanol) containing between about 2 to about 20 wt. %, more preferably between about 3 to about 8 wt. %, and optimally about 5 wt. %, of the binder material dissolved therein. The SAP material (which is insoluble in the linear alcohol) is dispersed in the alcohol/binder solution using sufficient mechanical agitation via agitator 54 to maintain the SAP material in suspension (i.e., prevent settling in the tank 48). The amount of the SAP material which is dispersed in the alcoholic solution of binder material will be sufficient to achieve the amount of SAP material add-on to the finished fiber, depending on the residence time of the yarn in the dip tank, as described previously. The viscosity of the liquid bath comprised of the alcohol/binder solution and the dispersion of SAP material, when determined using a #2 Zahn Cup at 70 F, is between about 12 seconds to about 30 seconds and most preferably between about 15 to about 20 seconds. An available stand-by supply of the liquid coating material 46 is provided by make-up tank 56 having an agitator 58 for a similar purpose as agitator 54.

The wet-coated yarn 32 is most preferably conveyed continuously through a dryer 60 where the alcohol solvent is evaporated thereby leaving the dried residue of the SAP material bound to the surfaces of the filaments in the yarn via the binder. The alcohol that is evaporated during the drying step may be recaptured and recycled to the start of the process or may be combusted prior to being exhausted to atmosphere. The temperature of the dryer and residence time of the wet-coated yarn should be such that an elevated coating temperature is achieved which is below the melt temperature of the SAP material, but above the melt temperature of the binder. For this reason, the melting points of the SAP material should have a melting point which is at least about 5° C., and more preferably at least about 10° C., greater than the melting point of the binder. The temperature of the coating material should therefore not be at or above both the melt temperatures of the SAP material and the binder as this might cause the two polymers to become at least partially melt-blended with one another thereby significantly decreasing the water-absorbing effectiveness of the SAP material. By way of example, the dryer may be operated at about 200° C. using a polyester yarn coated with sodium polyacrylate SAP and a nylon mulitpolymer binder.

The present invention will be further understood from the following non-limiting Examples.

EXAMPLES

The following tests were employed to obtain data from the Examples below:

Swell Cup Test Method: This test determines the swell rate (SR) and the swelling value (SV) of a sample by determining the linear displacement of a plunger which is raised in response to sample swelling. Coated yarn is cut into approximately ½-inch lengths and 1 gram of yarn is placed on the bottom surface of a cup having an inside diameter of 80 mm. Place an 80 mm covering tissue on top of the sample yarn. A cylindrical ram having a mass of 61.5 grams (+/−0.5 g) and an outside diameter of 79 mm is placed into the cup so as to rest upon the cover tissue and coated yarn lengths covering the cup bottom. Approximately 150 ml of water is thereafter poured into the cup until the water level is about 2 mm from the top of the ram. Simultaneously with the addition of the water, a stop watch is started. After 1 minute and 10 seconds elapses, the height the ram rises in the cup due to sample swelling is measured and the data recorded as both the swelling value (mm) after 1 minute and the swelling rate (mm/minute). (An initial period of 10 seconds is used to allow the water to reach the coated yarn samples—thus, the 1 minute, 10 seconds time interval.) Ram height displacements (mm) are also recorded after 3 and 5 minutes, respectively, to determine the swelling values at each such time interval.

Funnel Test Method: This test measures the absorption capacity (Ac) of a sample. The absorption capacity is the amount of water that can be retained by a material in a unit period of time. A funnel is lined with pre-wet filter paper and weighed to obtain an empty funnel apparatus mass (Ma) in grams. A quantity of sample yarn segments having an approximate length of 1 cm each is weighed to determine the sample mass (Ms) in grams. The sample yarn is then placed in the funnel. The funnel is immersed in a beaker of water, not to exceed its upper edge, for 3 minutes after which the funnel is removed from the beaker and allowed to drain for 1 minute to remove excess water. Next, the funnel, filter paper and now water swollen sample yarns are again weighed to determine the final mass (Mf) in grams. The absorption capacity (Ac) is determined by subtracting the funnel mass (Ma) from the final mass (Mf) and dividing the result by the sample mass (Ms). The absorption capacity (Ac) is thus the amount of water in grams which is retained per gram of yarn sample in three minutes and is designated $g_w/g_y$.

Example 1

A coating batch containing 5 wt. % nylon multipolymer resin (Shakespeare Type 651) dissolved in methanol was prepared, following which, 3.5 parts of SAP (CABLOC® 80HS) particles were added to the bath per one part of the nylon multipolymer to form a nonaqueous coating composition. The coating composition was mechanically agitated sufficiently to maintain the SAP particles in suspension. A 1500 denier flat polyester yarn was then brought into contact with the coating composition to achieve a 40 wt. % (+/−) total coating material pickup based on the total dried yarn weight. The coated yarn was found to have an absorption capacity of 55 $g_w/g_y$. Additional properties of the yarn according to this Example are shown in accompanying Table A.

Example 2

Example 1 was repeated except that 300 denier textured polyester yarn was used and brought into contact with the coating composition to achieve a 70 wt. % (+/−) total coating material pickup based on the total dried yarn weight. The coated yarn was found to have an absorption capacity of 90 $g_w/g_y$. Additional properties of the yarn according to this Example are shown in accompanying Table A.

Example 3

Example 2 was repeated except that 600 denier textured polyester yarn was used. The coated yarn was found to have an absorption capacity of 90 $g_w/g_y$. Additional properties of the yarn according to this Example are shown in accompanying Table A.

Example 4

Example 1 was repeated except that a twisted & plied (1500×3) aramid yarn (4500 total denier) was used and brought into contact with the coating composition to achieve a 24 wt. % (+/−) total coating material pickup based on the total dried yarn weight. Additional properties of the yarn according to this Example are shown in accompanying Table A.

Example 5

Example 1 was repeated except with a 1420 denier flat aramid yarn (DuPont, KEVLAR® Type 968) was used. Additional properties of the yarn according to this Example are shown in accompanying Table A.

TABLE A

|  | EXAMPLES | | | | |
| --- | --- | --- | --- | --- | --- |
|  | Ex. 1 | Ex. 2 | Ex. 3 | Ex. 4 | Ex. 5 |
| Finished Yield (M/Kg) | 3598 | 9072 | 4436 | 1512 | 3527 |
| Uncoated Yarn Denier (g/9000 M) | 1500 | 300 | 600 | 4500 | 1420 |
| Coated Denier (g/9000 M) | 2500 | 992 | 2030 | 5950 | 2550 |
| Absorption Capacity ($g_w/g_y$) | 55 | 90 | 90 | 27 | 53 |
| Total Absorption Capacity ($G_w$/9000 M) | 137500 | 89280 | 182700 | 160650 | 135150 |
| Per Meter Absorption Capacity ($g_w$M) | 15.27 | 9.92 | 20.32 | 17.85 | 15.01 |
| Meters of Coated Yarn per Unit Wt. (M/g) | 3.60 | 9.07 | 4.44 | 1.51 | 3.53 |
| Swelling Value (mm): |  |  |  |  |  |
| 1 min.: | 5.97 | 7.25 | 6.05 | 1.62 | 5.80 |
| 3 min.: | 7.17 | 13.78 | 11.20 | 1.81 | 7.00 |
| 5 min.: | 7.70 | 16.20 | 13.57 | 1.90 | 7.65 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated yarn comprised of multiple continuous filaments and a coating material on the yarn which coating material comprises an evaporative dried residue of a nonaqueous, water-insoluble, alcohol soluble nylon polymeric binder solution and solid superabsorbant polymer (SAP) particles dispersed therein.

2. A multifilamentary yarn comprising a coating material which includes solid superabsorbant polymer (SAP) particles, and a dried nylon binder which binds the SAP particles to surfaces of the yarn, wherein said nylon binder is soluble in linear alcohols, insoluble in water, and has a melt temperature which is at least 5° C. less than the melting point of the SAP particles.

3. The yarn of claim 2, wherein the SAP particles are present in an amount sufficient to impart an absorption capacity to the yarn of between about 5 to about 140 grams of water per gram of yarn ($g_w/g_y$).

4. The yarn of claim 3, wherein the absorption capacity is between about 5 to about 55 $g_w/g_y$ for twisted & plied yarns.

5. The yarn of claim 3, wherein the absorption capacity is between about 25 to about 85 $g_w/g_y$ for flat yarns.

6. The yarn of claim 3, wherein the absorption capacity is between about 50 to about 140 $g_w/g_y$ for textured yarns.

7. The yarn of claim 2, wherein the SAP particles are present in the dried coating in an amount between about 25 wt. % to about 95 wt. %, based on the total dried coating weight.

8. The yarn of clam 2, wherein the SAP particles are selected from homopolymers, copolymers and mixtures of sodium and potassium polyacrylates, starch grafted sodium polyacrylates and partial sodium salts of polypropenoic acid.

9. The yarn of claim 8, wherein the SAP particles have an average particle size of between about 1 to about 900 µm.

10. The yarn of claim 2, comprised of multiple continuous filaments formed from polyester, polyamide, polyolefins, aramid polymers or fiberglass, or any combination thereof.

11. A waterblocked telecommunications cable which includes a coated yarn comprised of multiple continuous filaments and a coating material on the yarn which coating material comprises an evaporative dried residue of a nonaqueous, alcohol soluble nylon polymeric binder solution and solid superabsorbant polymer (SAP) particles dispersed therein.

12. A waterblocked telecommunications cable which includes a multifilamentary yarn comprising a coating material which includes solid superabsorbant polymer (SAP) particles, and a dried nylon binder which binds the SAP particles to surfaces of the yarn, wherein said nylon binder is soluble in linear alcohols and has a melt temperature which is at least 5° C. less than the melting point of the SAP particles.

13. The waterblocked telecommunications cable of claim 11 or 12, wherein the SAP particles are selected from homopolymers, copolymers and mixtures of sodium and potassium polyacrylates, starch grafted sodium polyacrylates and partial sodium salts of polypropenoic acid.

14. The waterblocked telecommunications cable of claim 13, wherein the SAP particles have an average particle size of between about 1 to about 900 µm.

15. The waterblocked telecommunications cable of claim 4 or 12, comprised of multiple continuous filaments formed from polyester, polyamide, polyolefins, aramid polymers or fiberglass, or any combination thereof.

16. The waterblocked telecommunications cable of claim 11 or 12, wherein the SAP particles are present in an amount sufficient to impart an absorption capacity to the yarn of between about 5 to about 140 grams of water per gram of yarn ($g_w/g_y$).

17. The waterblocked telecommunications cable of claim 16, wherein the absorption capacity is between about 5 to about 55 $g_w/g_y$ for twisted & plied yarns.

18. The waterblocked telecommunications cable of claim 17, wherein the SAP particles are present in the dried coating in an amount between about 25 wt. % to about 95 wt. %, based on the total dried coating weight.

19. The waterblocked telecommunications cable of claim 16, wherein the absorption capacity is between about 25 to about 85 $g_w/g_y$ for flat yarns.

20. The waterblocked telecommunications cable of claim 16, wherein the absorption capacity is between about 50 to about 140 $g_w/g_y$ for textured yarns.

21. A method of making a coated multifilamentary yarn comprising the steps of:
   (a) bringing an uncoated yarn into contact with a nonaqueous liquid coating material comprised of a water-insoluble nylon binder dissolved in an alcohol solvent containing a dispersion of solid superabsorbant polymer (SAP) particles for a time sufficient to coat the yarn with the liquid coating material;
   (b) drying the coated yarn at an elevated temperature above the melting point of the nylon binder but below the melting point of the SAP particles for a time sufficient to evaporate the alcohol solvent such that the solid SAP particles are bound to the yarn surfaces by the dried residue of the nylon binder.

22. The method of claim 12, wherein the nylon binder is dissolved in an alcohol solvent in an amount between about 2 to about 20 wt. % of nylon binder to alcohol solvent.

23. The method as in claim 22, wherein the nylon binder is dissolved in an alcohol solvent in an amount between about 3 to about 8 wt. % of nylon binder to alcohol solvent.

24. The method as in claim 22, wherein the nylon binder is dissolved in an alcohol solvent in an amount about 5 wt. % of nylon binder to alcohol solvent.

25. The method of claim 21, wherein the viscosity of the liquid bath comprised of the alcohol/binder solution and the dispersion of SAP material, when determined using a #2 Zahn Cup at 70F, is between about 12 seconds to about 30 seconds and most preferably between about 15 to about 20 seconds.

26. The method of claim 21, wherein the SAP particles are present in the liquid coating material and wherein step (a) includes bringing the yarn into contact with the liquid coating material for a time sufficient to achieve a dried coating weight of between about 10 wt. % to 75 wt. % based on the total dried yarn weight.

27. The method of clam 21, wherein the SAP particles are selected from homopolymers, copolymers and mixtures of sodium and potassium polyacrylates, starch grafted sodium polyacrylates and partial sodium salts of polypropenoic acid.

28. The method of claim 27, wherein the SAP particles have an average particle size of between about 1 to about 900 μm.

29. The method of claim 21, wherein the yarn is comprised of multiple continuous filaments including at least one filament selected from the group consisting of polyester, polyamide, polyolefin, aramid and fiberglass filaments.

30. A coated multifilamentary yarn made by the method of any one of claims 21–27.

* * * * *

UNITED STATES PATENT AND TRADEMARK OFFICE
CERTIFICATE OF CORRECTION

PATENT NO.     : 6,500,541 B1
DATED          : December 31, 2002
INVENTOR(S)    : Vincent E. Schoeck Jr., et al.

It is certified that error appears in the above-identified patent and that said Letters Patent is hereby corrected as shown below:

<u>Title Page,</u>
Item [73], Asssignee, change "Fil-Tech, Inc." to -- Fil-Tec, Inc. --

Signed and Sealed this

Eleventh Day of March, 2003

JAMES E. ROGAN
*Director of the United States Patent and Trademark Office*